United States Patent Office 3,429,234
Patented Feb. 25, 1969

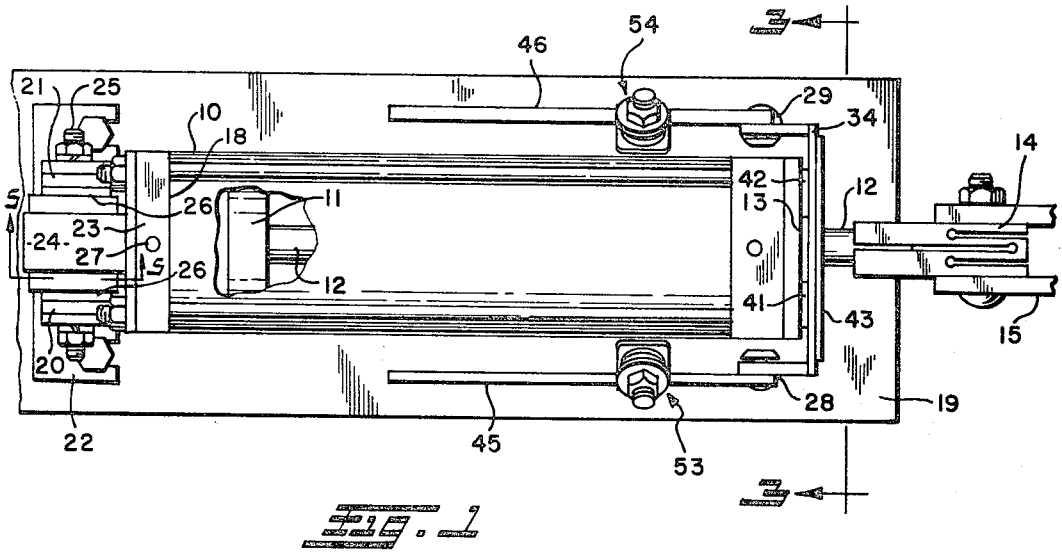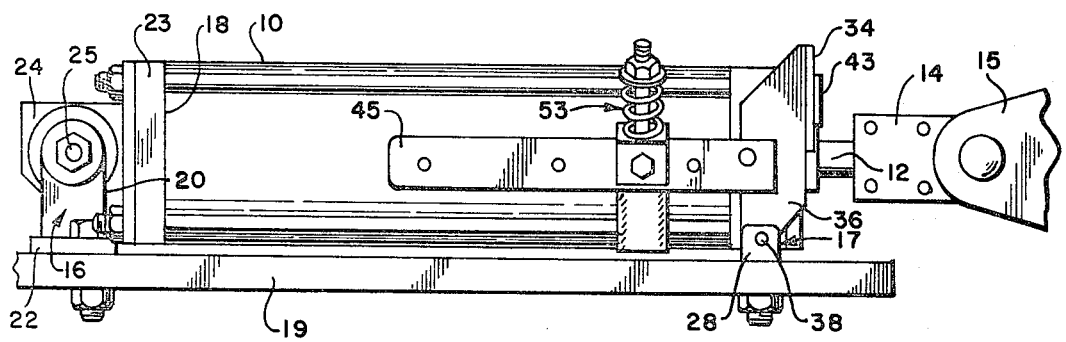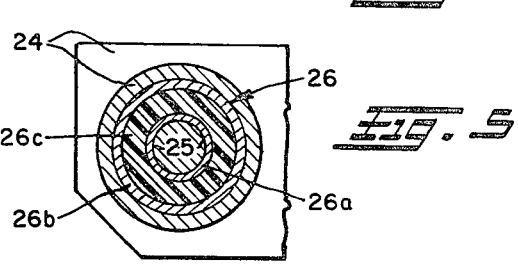

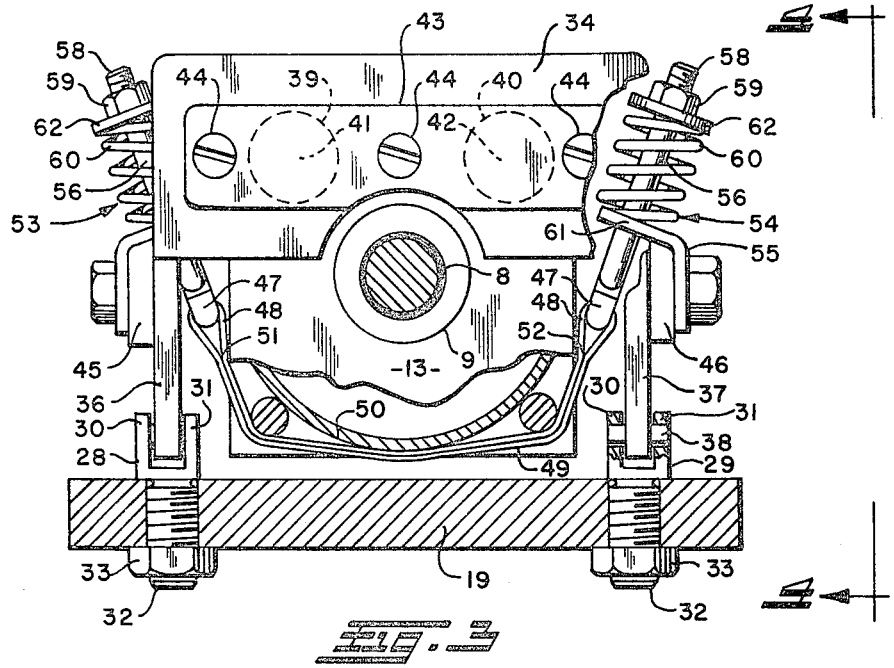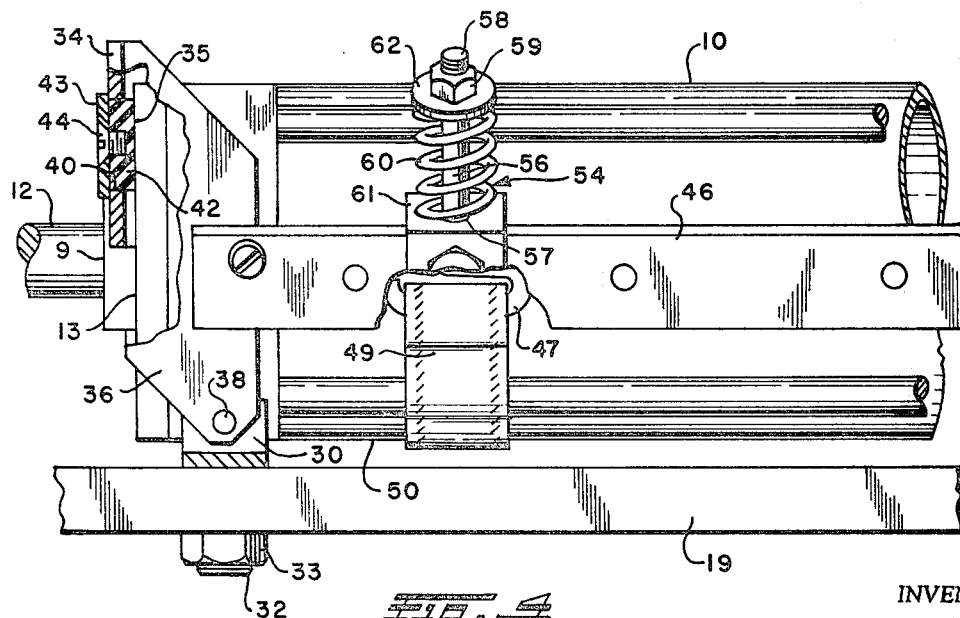

3,429,234
SUPPORT AND DAMPENING MEANS
John J. Taylor, Medina, Ohio, assignor to The Ohio Brass Company, Mansfield, Ohio, a corporation of New Jersey
Filed Sept. 19, 1966, Ser. No. 580,531
U.S. Cl. 92—143         13 Claims
Int. Cl. F01b 29/08; F16m 1/02; F16f 15/04

ABSTRACT OF THE DISCLOSURE

A cylinder containing a reciprocal piston and a mount for the cylinder. The mount is designed to dampen vibrations caused when the piston reciprocates within the cylinder, to keep the piston axially aligned with the cylinder, thereby preventing the rod of the piston from binding in the cylinder end from which the rod protrudes.

*Background of the invention*

This invention relates generally to supports and more particularly to a support and dampening means for a cylinder containing a reciprocating piston.

One of the big problems in using a commonly referred to air or hydraulic cylinder, especially cylinders having a piston stroke over 9 inches, is providing a suitable support or mounting for the cylinder. Such a support should be able to absorb impact shocks and dampen vibrations of the cylinder. Further, the piston and attached piston rod move along an axis which normally coincides with the longitudinal axis of the cylinder. Sometimes, however, forces acting on the free end of the piston rod protruding from the cylinder cause a slight variation in the axis along which the piston rod moves, and unless the cylinder can be adjusted to compensate for this slight variation in the axial movement of the piston rod, the rod will tend to bind in the packing of the gland in the cylinder head causing extreme wear on the rod, and packing or gland, which, in turn, provides an unsuitable clearance between the rod and gland packing. Abrasive dirt can pass through this clearance into the cylinder and destroy, for example, the walls or the cylinder, or the piston rings.

It should be appreciated that a rigid mounting could not compensate for this slight variation of movement. An extremely resilient mounting on the other hand would tend to overcompensate for such slight movement and cause the cylinder to fluctuate between extreme positions causing even greater wear on the piston rod and gland packing. Also, the rod might buckle when it is fully extended from the cylinder. Further, such a resilient mounting would tend to absorb some of the energy expended against the piston for driving the piston within the cylinder.

This invention is directed to providing a cylinder mount which absorbs impact shocks and dampens vibrations of the cylinder, yet firmly holds the cylinder while permitting slight movement of the cylinder to axially align itself with the axial movement of the piston rod in order to adjust for slight variations in the axis along which the rod moves.

Briefly stated, then, the invention is in a means for mounting a conventionally-designed air or hydraulic cylinder containing a reciprocable piston with a piston rod protruding from one end of the cylinder. In accordance herewith, the cylinder mount includes a pivotally mounted bracket with an abutment for positioning adjacent the cylinder head, or end of the cylinder from which the piston rod protrudes. Also provided is a bracket for resiliently and pivotally mounting the other end of the cylinder such that the cylinder can be angularly displaced and rotated about the bracket. The abutment carries resilient means for compressively and frictionally engaging the cylinder head. Further, means are coupled to the abutment for resiliently supporting the cylinder head adjacent the abutment. The brackets cooperate to dampen vibration of the cylinder, absorb shock and allow limited movement of the cylinder in order that the cylinder can align itself with the piston rod such that the piston rod will always move along an axis which is parallel to the longitudinal axis of the cylinder.

The following description of the invention will be better understood by having reference to the annexed drawing, wherein:

FIG. 1 is a top view of the cylinder and mount;
FIG. 2 is a side view of the cylinder and mount;
FIG. 3 is an end view of the cylinder and mount, as seen from the plane indicated by the line 3—3 of FIG. 1;
FIG. 4 is an enlarged side view of one of the cylinder ends as seen from the plane indicated by the line 4—4 of FIG. 3; and
FIG. 5 is an enlarged sectional view taken in the plane indicated by the line 5—5 of FIG. 1.

Referring more particularly to FIGS. 1-4 there is shown a conventionally-designed air or hydraulic cylinder 10 containing a reciprocable piston 11 with a piston rod 12 protruding from the front end or head 13 of the cylinder 10. The piston rod 12 extends through the packing 8 of a gland 9 centrally disposed in the cylinder head 13. The free end 14 of the piston rod 12 extending from the cylinder 10 is pivotally mounted to any suitable mechanism 15 desired to be driven or reciprocated by the piston 11 moving within the cylinder 10.

A pair of spaced rear and front brackets, generally indicated at 16 and 17, are provided for supporting corresponding rear and front ends 18 and 13 of the cylinder 10. The brackets 16 and 17 can be mounted on any suitable support such as a plate or surface 19.

The rear bracket 16 comprises a pair of parallel pivot arms 20 and 21 extending from a base plate 22 which can be bolted to the supporting plate 19.

A cap 23 is provided for sealing the open end 18 of the cylinder 10. The cylinder cap 23 has an outstanding lug or bracket 24 which is journalled for rotation about a pivot pin 25 extending between the upstanding pivot arms 21 and 22 of the rear cylinder mount on bracket 16.

A bearing 26 is provided between the lug 24 and pivot pin 25. The bearing 26 preferably consists of an inner sleeve 26a and an outer sleeve 26b, the sleeves being concentric about the pivot pin 25 and separated by elastomeric materials 26c, e.g. rubber, for cushioning impact shocks upon the cylinder 10, dampening transverse vibrations of the adjacent cylinder end 18, and adjusting the adjacent cylinder end 18 for misalignment. Similar results can be obtained by interposing a pair of metal discs separated by elastomeric material, adjacent and parallel to the cylinder end cap 23. Thus, the cylinder 10 can be rotated about the pivot pin 25, and displaced axially and angularly to a limited extent depending on the elastomeric material used.

The cylinder cap 23 is hollow and in communication with the inside of the cylinder 10. A hose (not shown) for supplying air or hydraulic fluid to the cylinder 10 can be secured in the threaded opening 27 of the cylinder cap 23 by any conventional coupling. Fluid for operating the piston 11 is circulated through the cylinder cap 23 into the cylinder 10.

The front bracket generally indicated at 17, comprises a pair of spaced brackets 28 and 29 each having bifurcated pivot arms 30 and 31 with threaded shanks 32, which are mounted on the supporting plate 19 by any suitable means, e.g. nuts 33. A front plate or abutment 34 is provided for positioning adjacent the top portion 35 of the cylinder head 13. A pair of parallel legs 36 and 37 extending from the front abutment 34, are mounted between the bifurcated arms 30 and 31 of the front mountings 28 and 29 by any suitable means, e.g. pivot pins 38. Thus, the front abutment 34 is rotatable in a plane normal to the pivot pin 25 about which the cylinder 10 can be rotated. The front abutment 34 is thus rotated into position adjacent the cylinder head 13.

The front abutment 34 has a pair of openings 39 and 40 for receiving a pair of wear resistant, resilient plugs or pads 41 and 42. The pads 41 and 42 can be made of any suitable elastomeric material, e.g. a polyurethane elatomer. The pads 41 and 42 provide frictional resistance to any transverse movement of the cylinder head 13. The pads 41 and 42 are secured in the openings 39 and 40 in compressed relation against the cylinder head 13 by a cover plate 43 which covers the pads and is secured to the front plate 34 by any suitable means, e.g. a plurality of screws 44.

A pair of cylinder support arms 45 and 46 are secured as by welding to the legs 36 and 37 of the front bracket 17. The support arms 45 and 46 are normal to the plane of the front abutment 34, and are designed to extend along either side of the cylinder 10.

A spring biased strap hanger 49 partially surrounding the lower half 50 of the cylinder 10, is provided for resiliently supporting the adjacent cylinder head 13. A pair of similar brackets generally indicated at 53 and 54 are provided for tensioning the strap hanger 49. The tensioning brackets 53 and 54 are adjustable along the support arms 45 and 46, respectively.

The tensioning brackets 53 and 54 each comprise an angle 55 which is bolted to the supports 45 and 46, and adjustable therealong, that is, they can be bolted in a plurality of positions to vary the location of the strap hanger 49 relative to the cylinder head 13, or abutment 34.

A bar 56 having a reversely bent portion 47 for extending through a loop 48 formed in the ends 51 and 52 of the strap hanger 49, extends through an opening 57 in the angle 55. The free end 58 of the bar 56 is threaded for receiving a conventionally-designed nut 59.

A coil spring 60 is placed around the bar 56 between the leg 61 of the angle 55, and a washer 62 is held adjacent the nut 59. The tension in the strap hanger 49 is varied by adjusting the nut 59 on the threaded bar end 58. The compressive engagement between the pads 41 and 42 and adjacent cylinder head 13 is increased by positioning the supporting strap hanger 49 farther away from the cylinder head 13. Thus, the frictional resistance of the pads 41 and 42 is increased.

The front and rear brackets 16 and 17 cooperate to provide a cylinder mounting which allows the cylinder head to freely follow the device that it propels. The cylinder mounting also damps out incipient vibration, floats the cylinder weight, provides elastomer cushioning to reduce end-of-stroke shock, and limits movement of the cylinder head to prevent column buckling (buckling of the piston rod) of the cylinder and rod assembly under maximum working load.

Thus, there has been provided a new and novel support or mounting which is especially well suited for a commonly referred to hydraulic or air cylinders, and especially cylinders having a piston stroke of over 9 inches.

What is claimed is:
1. A mounting for a cylinder having opposing ends, and containing a reciprocable piston with a piston rod protruding from one end of the cylinder, known as the cylinder head, comprising in combination:
   (a) an abutment for positioning adjacent the cylinder head;
   (b) a rear bracket disposed at the other end of the cylinder;
   (c) means coacting with the rear bracket for resiliently supporting the adjacent end of the cylinder;
   (d) means carried by the abutment for frictionally engaging the cylinder head; and
   (e) means coupled to the abutment for resiliently supporting the cylinder adjacent the cylinder head, said cylinder mounting designed to dampen vibrations of the cylinder, absorb end-of-stroke shock, and allow slight movement of the cylinder to adjust for misalignment of the piston rod with the cylinder.

2. The mounting of claim 1, wherein the means (d) includes at least one pad formed from elastomeric material for compressively engaging the adjacent cylinder head.

3. The mounting of claim 1, wherein the means (e) includes (1) a strap hanger extending partially around the cylinder; and (2) means for varying the tension in the strap hanger.

4. The mounting of claim 1, wherein the means (c) includes elastomeric material disposed between the rear bracket and adjacent end of the cylinder for permitting resilient relative movement therebetween.

5. A mounting for a cylinder having opposing ends and containing a reciprocable piston with a piston rod protruding from one end of the cylinder known as the cylinder head, comprising in combination:
   (a) an abutment pivotally mounted for positioning adjacent the cylinder head;
   (b) a bracket disposed at the other end of the cylinder, the cylinder pivotally mounted on the bracket for rotation about an axis normal to the axis of the cylinder, such that the cylinder head can be rotated towards and away from the abutment;
   (c) at least one resilient pad carried by the abutment for compressively engaging the cylinder head such that frictional forces between the pad and cylinder head dampen vibrations transversely imparted to the cylinder head;
   (d) a strap hanger coupled to the abutment and partially surrounding the cylinder for resiliently supporting the cylinder adjacent the cylinder head; and
   (e) elastomeric material disposed between the bracket and adjacent end of the cylinder for permitting resilient relative movement therebetween.

6. The mounting of claim 5, which includes:
   (f) means for tensioning the strap hanger.

7. The mounting of claim 6, which includes:
   (g) means for varying the position of the strap hanger relative to the abutment and pad carried thereby.

8. A mounting for a cylinder containing a reciprocable piston with a piston rod protruding from one end of the cylinder comprising in combination two spaced brackets for supporting the ends of the cylinder, the first of said two brackets including:
   (a) means coacting with the cylinder end from which the piston rod does not protrude, for mounting the cylinder such that the cylinder can be rotated and angularly displaced; and the second of said two brackets including:
   (b) an abutment for positioning adjacent the cylinder head from which the piston rod protrudes;
   (c) at least one resilient pad carried by the abutment for engaging the adjacent cylinder head to damped transverse vibrations imparted to said head; and
   (d) means coupled to the abutment for resiliently supporting the cylinder adjacent the cylinder head, said brackets designed to dampen vibrations imparted to the cylinder, absorb end-of-stroke shock, and allow slight movement of the cylinder to adjust for misalignment of the piston rod with the cylinder.

9. The mounting of claim 8, wherein the means (d) includes:
   (e) a strap hanger extending partially around the cylinder for supporting the cylinder;
   (f) a spring coacting with each end of the strap hanger for biasing said hanger; and
   (g) means for adjusting the tension in the spring.

10. The mounting of claim 9, wherein the second of said two brackets includes:

(h) a pair of arms extending from the abutment and alongside the cylinder when engaging said pad, the arms being parallel to the longitudinal axis of the cylinder, and provided for supporting the ends of said strap hanger.

11. In combination:
(a) a cylinder containing a reciprocable piston with a piston rod protruding from one end of the cylinder;
(b) a mounting for the cylinder comprising two spaced brackets for supporting the ends of the cylinder, the first of said brackets including:
  (1) means coacting with the cylinder end from which the piston rod does not protrude, for mounting the cylinder such that the cylinder can be rotated in a multiplicity of planes and angularly displaced; and the second of said two brackets including:
  (2) an abutment for positioning adjacent the end of the cylinder from which the piston rod protrudes;
  (3) at least one resilient pad carried by the abutment for frictionally engaging the adjacent cylinder end;
  (4) means for mounting said abutment such that the abutment can be rotated into position adjacent the cylinder end;
  (5) means coupled to said abutment for resiliently supporting the end of the cylinder engaging said pad, said brackets absorbing end-of-stroke shock, dampening transverse vibrations imparted to said cylinder, and allowing slight movement of the cylinder to adjust for misalignment of the piston rod and cylinder.

12. The combination of claim 11, wherein the means (5) includes:
  (6) a strap hanger extending partially around the cylinder for supporting the cylinder; and
  (7) means for adjusting the tension in the strap hanger.

13. The combination of claim 12, which includes:
  (8) a pair of arms extending from the abutment and alongside the cylinder, the arms being parallel to the longitudinal axis of the cylinder, and provided to support the strap hanger.

References Cited

UNITED STATES PATENTS

| | | | |
|---|---|---|---|
| 1,653,239 | 12/1927 | Spreen | 248—16 X |
| 1,781,161 | 11/1930 | Carrey | 248—21 |
| 2,331,628 | 10/1943 | Piron | 248—17 |
| 2,544,866 | 3/1951 | Travis | 92—161 X |
| 2,749,160 | 6/1956 | Cowels | 248—358 X |
| 3,340,835 | 9/1967 | Cook et al. | 248—9 X |

MARTIN P. SCHWADRON, *Primary Examiner.*

IRWIN C. COHEN, *Assistant Examiner.*

U.S. Cl. X.R.

92—161; 248—8, 17, 21, 18